United States Patent [19]

Jastrzebski et al.

[11] 4,277,574
[45] Jul. 7, 1981

[54] PROCESS FOR PREPARING ABS POLYBLENDS

[75] Inventors: Michael B. Jastrzebski, Ware; Allen R. Padwa, Westfield, both of Mass.

[73] Assignee: Monsanto Company, St. Louis, Mo.

[21] Appl. No.: 95,708

[22] Filed: Nov. 19, 1979

[51] Int. Cl.³ .................. C08L 9/00; C08L 147/00; C08L 47/00
[52] U.S. Cl. .................................. 525/86; 525/87; 525/98; 525/99; 525/314; 525/316
[58] Field of Search ............... 525/86, 87, 99, 314, 525/316

[56] References Cited

U.S. PATENT DOCUMENTS

| | | | |
|---|---|---|---|
| 3,511,895 | 5/1970 | Kydonieus et al. | 525/98 |
| 3,591,537 | 7/1971 | Squire et al. | 525/98 |
| 3,642,947 | 2/1972 | Stein | 525/98 |
| 3,931,356 | 1/1976 | Dalton | 525/86 |
| 3,950,455 | 4/1976 | Okamoto et al. | 525/86 |

*Primary Examiner*—William F. Hamrock
*Attorney, Agent, or Firm*—Joseph S. Nelson; William J. Farrington; Edward P. Grattan

[57] ABSTRACT

The present invention relates to a process for preparing ABS polyblends having an alkenyl aromaticalkenyl nitrile monomer matrix polymeric phase reinforced with rubber particles grafted with said monomers and having a bimodal rubber particle size distribution, the process comprising: charging continuously a formulation of said monomers having a soluble diene dissolved therein and a first grafted diene rubber particle dispersed therein to a back-mixed reaction zone operating at 50-80% steady state, flow-through, conversion of said monomer formulation, continuously mass polymerizing said charged monomer formulation to 50-80% conversion, forming and dispersing said soluble rubber as second grafted diene particles having a particle size larger than said first grafted rubber particles, continuously withdrawing an effluent from said reaction zone and separating said ABS polyblend from said effluent.

19 Claims, No Drawings

PROCESS FOR PREPARING ABS POLYBLENDS

BACKGROUND OF THE INVENTION

As is well known, polyblends of rubber with styrene/acrylonitrile polymers have significant advantages in providing compositions of desirable resistance to impact for many applications. Various processes have been suggested or utilized for the manufacture of such polyblends including emulsion, suspension and mass polymerization techniques and combinations thereof. Although graft blends of a monoalkenyl aromatic and ethylenically unsaturated nitrile monomers and rubber prepared in mass exhibit desirable properties, this technique has a practical limitation upon the maximum degree of conversion of monomers to polymer which can be effected because of the high viscosities which are encountered when the reactions are carried beyond a fairly low degree of conversion after phase inversion takes place. As a result, techniques have been adopted wherein the initial polymerization is carried out in mass to a point of conversion beyond phase inversion at which the viscosity levels are still of practical magnitudes, after which the resulting prepolymerization syrup is suspended in water or other inert liquid and polymerization of the monomers carried to substantial completion.

N. E. Aubrey in U.S. Pat. No. 3,509,237 disclosed a mass/suspension method of polymerization styrene/acrylonitrile having diene rubbers dissolved therein with the rubber being grafted, inverted and dispersed as rubber particles under agitation. After phase inversion, the viscous mixture is suspended in water and polymerization is completed producing a polyblend in the form of beads.

Such mass/suspension processes are used commercially, however, present the economic problems of batch operations requiring long cycles at relatively low temperatures to control the heat of polymerization. Continuous mass polymerization processes have great economic advantages if they can be run at higher temperatures and higher rates with the necessary control of the great heats of polymerization. In the case of polyblends, the dispersed rubber phase must be formed and stabilized as to its morphology bringing it through the continuous polymerization of the rigid matrix polymer phase so that the physical properties of the polyblend meet exacting property specifications.

Various methods have been developed for the continuous mass polymerization of polyblends. Ruffing et.al. in U.S. Pat. No. 3,248,481 disclose a process wherein the diene rubbers are dissolved in predominantly monovinylidene aromatic monomers and polymerized in four reaction zones. Such processes require physically separated reactors providing different reacting conditions for each step of polymerization involving costly multiple reactors and specialized equipment.

Bronstert et.al. disclose in U.S. Pat. No. 3,658,946 a similar process wherein the prepolymerization step is run to a solids content of no more than 16% to provide a rubber particle having a particular structure. Bronstert et.al. disclose a need for separated nonstirred downstream reactors for final polymerization each providing a particular set of reacting conditions to insure final properties for the polyblend.

Okasaka et.al. disclose in U.S. Pat. No. 3,751,526 a process for producing rubber modified thermoplastic resins by extracting a grafted diene rubber from a latex into a styrene-acrylonitrile monomer phase, separating the monomer-rubber phase from the water phase and mass polymerizing the monomer-rubber phase to provide a polyblend of styrene/acrylonitrile polymer and a single grafted rubber phase.

N. E. Aubrey in U.S. Pat. No. 3,509,237 further discloses a process for preparing styrene/acrylonitrile/rubber polyblends having a first and second grafted rubber phase wherein the first grafted rubber has a large particle size and the second grafted rubber has a smaller particle size. Such polyblends have superior properties if the smaller particle size rubber phase constitutes the largest proportion of the total rubber phase. A process for making such polyblends is disclosed wherein the two grafted rubber polyblends are prepared in batch processes separately and thereafter melt blended mechanically to form a polyblend having a first and second grafted rubber phase.

Accordingly, it is an objective of the present invention to provide a continuous polymerization process that will produce rubber modified ABS type polymeric polyblends having a matrix polymer phase of predetermined average molecular weight and molecular weight distribution.

Another objective of this invention is to provide a continuous polymerization process for producing ABS type polyblends having first and second grafted rubber phase particles of predetermined morphology.

Another objective of this invention is to provide a continuous mass polymerization process with the necessary heat control using only one reaction zone minimizing the need for two or more reaction zones with extended conversion cycles and costly process equipment or the need for batch operations in preparing polyblends having two rubber phases having different morphology, in particular, a bimodal size distribution for the rubber particles.

SUMMARY OF THE PROCESS

It has been found that the foregoing and related objectives and their advantages may be readily obtained by the present invention which relates to a continuous mass polymerization process for preparing a polymeric polyblend, the steps comprising:

A. continuously charging a monomer formulation of alkenyl aromatic and alkenyl nitrile monomers having a soluble diene rubber dissolved therein and first grafted diene rubber particles dispersed therein to a reaction zone, said first grafted diene rubber particles having an average particle size of about 0.01 to 0.5 microns, said reaction zone operating at a conversion of said monomer formulation of about 30 to 80%, B. continuously mass polymerizing said charged monomer formulation in said reaction zone, to a conversion of about 30 to 80%, while forming and dispersing said soluble diene rubber as second grafted diene rubber particles having present occluded and grafted polymers of said monomers in amount of about 0.5 to 5.0 parts per part of rubber, said second grafted diene rubber particles having an average particle size of about 0.7 to 10.0 microns, said monomers forming a copolymer of said monomers as a matrix phase polymer having said first and second rubber particles dispersed therein, C. continuously removing an effluent from said reaction zone at a rate essentially equal to that of said charged monomer formulation, and D. separating said matrix polymer having said first and second grafted rubber particles dispersed therein from said effluent as said ABS polyblend having a bimodal rubber particle size distribution.

PREFERRED EMBODIMENTS

The Monomer Formulation

The monomer formulation comprises, at least principally, a monoalkenylaromatic monomer and an ethylically unsaturated nitrile monomer. The monoalkenylaromatic monomer comprises at least one monomer of the formula:

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alph-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

Exemplary of the unsaturated nitriles which may be used in the interpolymers are acrylonitrile, methacrylonitrile, ethacrylonitrile and mixtures thereof.

Exemplary of the monomers which may be interpolymerized with the monoalkenylaromatic hydrocarbons and unsaturated nitriles are conjugated 1,3-dienes, e.g. butadiene, isoprene, etc.; alpha- or beta-unsaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc. vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monoalkenylaromatic hydrocarbon or interpolymer thereof.

The polymerizable monomer mixtures contain at least 20% by weight of the monoalkenylaromatic monomer and preferable at least 50% by weight thereof. They also contain at least 5% by weight of the unsaturated nitrile and preferably at least 10% by weight thereof. From the standpoint of highly advantageous commercial practice, the monomer formulations contain 20 to 95% and preferably 60 to 85% by weight of the vinylidene aromatic hydrocarbon and 80 to 5% and preferably 40 to 15% by weight of the unsaturated nitrile.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalyst may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0% by weight and preferably on the order of 0.005 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

The Diene Rubber

The preferred rubbers are diene rubbers, including mixtures of diene rubbers, i.e., any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, 2-chloro-1,3-butadiene, 1-chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile;

alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alphaolefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about $-50°$ C. to $-105°$ C. as determined by ASTM Test D-746-52T.

The diene rubbers used in the first grafted rubber is of the type described above. A preferred group of rubbers are those consisting essentially of 75 to 100% by weight of butadiene and/or isoprene and up to 25% by weight of a monomer selected from the group consisting of monovinylidene aromatic hydrocarbons (e.g. styrene) and unsaturated nitriles (e.g. acrylonitrile) or mixtures thereof. Particularly advantageous substrates are butadiene homopolymer or an interpolymer of 90 to 95% by weight butadiene and 5 to 10% by weight of acrylonitrile or styrene. The diene rubber may contain up to about 2% of a crosslinking agent based on the weight of the rubber monomer or monomers. The crosslinking agent can be any of the agents conventionally employed for crosslinking diene rubbers, e.g. divinylbenzene, diallyl maleate, diallyl fumarate diallyl adipate, allyl acrylate, allyl methacrylate, diacrylates and dimethacrylates of polyhydric alcohols, e.g. ethylene glycol dimethacrylate, etc.

The diene rubber used in preparing the second grafted diene rubber is a soluble diene rubber of the type described above. The stereospecific polybutadiene rubbers are the most preferred for optimum physical properties of the polyblend.

The First Grafted Diene Rubber

Emulsion polymerization is preferred for polymerizing rubber monomers for the first grafted diene rubber since such will provide a small particle size distribution which is preferred for use in the present invention. Furthermore, emulsion polymerization of rubber monomers produces a latex which is useful as a base or starting point for subsequent emulsion polymerization and grafting of the monomers onto the preformed rubber in the preparation of the first grafted diene rubber wherein the rubber forms a substrate and the grafted monomers a superstrate.

The first grafted rubber may be prepared by polymerizing superstrate monomers in the presence of the preformed rubber substrate, generally in accordance with conventional emulsion grafted polymerization techniques. The preferred processes use an emulsion technique to obtain the particle size of not more than about 0.5 microns for the graft copolymer which is preferred for use in the practice of the present invention. In such graft polymerization, a preformed rubber substrate generally is dissolved or dispersed in the monomers and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted copolymer. The ratio of monomers to rubber charged to the graft polymerization reaction zone in a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.01 to 2.5% by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, all as those skilled in the art appreciate.

If desired, an aqueous latex formed in the emulsion polymerization of the rubber substrate may provide the aqueous medium onto which the monomers are grafted with or without the addition of further emulsifying agents, water and the like. A latex thereof may be separately prepared. Various water soluble free radical polymerization initiators are conventionally used for emulsion polymerization of the rubber monomer, including conventional peroxy- and azo-catalysts and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100° C. with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90% of the monomers have polymerized. The remaining monomers and other volatile components are then distilled away from the latex, preferably, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

Preparing The Monomer Formulation Having a Soluble and First Grafted Diene Rubber Dispersed Therein The latex containing the first grafted diene rubber can be dewatered by a monomer phase. The monomers used in the dewatering are alkenyl aromatic and alkenyl nitrile in ratios of 80:20 to 0:100, preferably the monomer mixture is at least 40% alkenyl nitrile and most preferably 45 to 70% by weight. The greater the weight percentage of the alkenyl nitrile monomer, the lower the viscosity of the liquid oil phase which provides a liquid oil phase of 20 to 100 cps when the monomer mixture is used in amounts of about 250 to 600 parts per 100 parts of grafted rubber particles. The lower the viscosity of the liquid oil phase, the more readily the liquid oil phase separates from the water phase allowing the phase to be separated by decanting, centrifuge or gravity separation in tanks wherein the water phase can be drawn off from the dewatering means. Processwise, the latex can be charged to a stirred tank dewatering means followed by mixing in said monomers and dispersing in a deemulsifying agent such as an acid, salt or a cationic surfactant. The mixing and dispersing steps are carried out with sufficient agitation to uniformly disperse the monomers and deemulsifying agent into the latex and allow the extraction step to occur. Simple experimentation with conventional stirred tanks can insure the proper dispersion so that the extraction step can occur. Depending on the size of the tank and the amount of latex, the extraction can be carried out in a relatively short period of time sufficient to insure the diffusion of monomer and cationic surfactant to the grafted rubber particles extracting them into the monomer or oil phase. The mixing, dispersing and extracting steps are preferably carried out at ambient temperatures. Temperatures of from 0° C. to 160° C. can be used. Temperatures over about 80° C. should be carried out in closed vessels under pressure to prevent loss of monomers.

The latex can have about 2 to 75% by weight of grafted rubber particles emulsified with an anionic type surfactant conventionally used in emulsion graft polymerization. Such anionic surfactant can be selected from the group consisting of alkali and alkaline earth salts of fatty acids, e.g., oleates, palmitates, stearates, abietates or mixtures thereof, alkyl or alkaryl sulfonates, dialkyl sulfosuccinates, sulfated or sulfonates esters and ethers, sulfated or sulfonates amides and amines. Any anionic surfactant can be used that has water solubility and a surface activity sufficient to emulsify said grafted rubber particles having a particle size of about 0.05 to 0.5 microns.

A preferred method uses a cationic surfactant in an amount sufficient to deemulsify the grafted rubber particles in the aqueous latex so that they are more readily extracted into the monomer or oil phase. It is believed that the cationic surfactants neutralize the anionic surfactants stoichiometrically. Complete neutralization is not necessary to break the emulsion and stoichiometric amounts of the cationic surfactant equal to about 60 to 100% of the anionic surfactant can be used. Since the surface activity of both surfactants has been essentially negated, the oil phase becomes essentially free of a water phase and the water phase becomes essentially free of an oil phase providing efficient extraction, separation of phases and dewatering. In the present process, all of the water soluble components of the latex are efficiently partitioned into the water phase providing a monomer phase essentially free of such components which can be polymerized to polyblends with reduced haze levels.

The cationic surfactants used can be selected from the group consisting of pyridinium salts, amine and quaternary ammonium salts, amine polyol block copolymer salts and imidazolinium salts or mixtures thereof. A preferred cationic surfactant is the amine polyol block copolymer salts, e.g., polyalkylene oxide block copolymers of diethylene diamine having the structure:

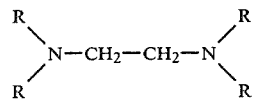

wherein R is,

form a salt with a solubilizing acid such as hydrochloric, sulfuric, acetic or phosphoric, said salt being a cationic surfactant. The amine can be selected from the group consisting of mono, di, tri and tetrofunctional amines. Such polyol amine materials are available from BASF Wyandote Corp. Parsippany, N.J., under the trademark, TETRONIC R Polyol Series. Aqueous solutions containing 1 to 5% by weight of a solubilizing acid can be used to form acid solutions having present 1 to 25% by weight of said polyol amine as a cationic surfactant and imidazo linium salts or mixtures thereof.

It has been found that the cationic surfactant can be used in smaller amount, e.g., as low as 10% the stoichiometric amount of the anionic surfactant present in the latex if an inorganic acid is added to the latex after the dispersion of said monomers and before the addition of the cationic surfactant, the amount of said acid being present in an amount necessary to bring the latex to a pH of about 1 to 3. The inorganic acids used can be, e.g., sulfuric or hydrochloric.

An alternative method of recovering the grafted rubber particles from the aqueous latex is to coagulate said latex with an acid or salt, filter of the rubber particles and wash and dry said rubber particles as a loose crumb. The crumb can then be dispersed in said monomer formulation in a stirred tank until the particles are colloidally dispersed as their original grafted size, i.e., having a particle size of about 0.05 to 0.5 microns. The grafted monomers act as an effective soap to disperse said particles in the monomer formulation.

The monomer phase having the dispersed first grafted diene rubber particles can be used as the monomer formulation or it can be adjusted as to the desired alkenyl aromatic/alkenyl nitrile ratio needed. The monomer formulation containing the first grafted diene rubber particles dispersed therein can then be mixed with a monomer formulation having a soluble diene rubber dissolved therein in an amount of about 1–15% by weight. The total amount of diene rubber moiety in the monomer formulation can be about 2 to 30% by weight with said soluble rubber moiety being about 5 to 50% by weight of the total rubber moiety.

Alternatively, the soluble rubber can be dissolved directly in the monomer formulation having the grafted diene rubber dispersed therein. The soluble rubber can be readily dissolved in a stirred tank containing said monomer formulation. Ambient temperatures can be used, however, temperatures of 40°–80° C. can be used if a conventional polymerization inhibitor is contained in said monomer formulation.

CONTINUOUS MASS POLYMERIZATION

The monomer formulation containing said soluble diene rubber dissolved therein and said grafted diene rubber particles dispersed therein is charged continuously to a reaction zone. The reaction zone can be a stirred tank reactor having vertical to horizontal orientation. Preferably the reactor is a flow-through, back-mixed reactor, operating at partial fillage of about 40 to 90%, with evaporative cooling under monomer reflux as described in U.S. Pat. No. 3,813,369 to G. A. Latinen.

The reactor is continuously operated at an average conversion of about 30–80% of said monomers. The monomer formulation charged to said reactor is continuously mass polymerized to an average conversion of about 30–80% as it flows through the reactor, having a dwell time in the back-mixed reactor sufficient to provide 30–80% conversion of said monomers.

The mass polymerization is carried out at about 90° to 180° C. under a pressure of about 5 to 150 psia with shearing agitation. The polymerization can be carried out thermally, without catalyst, or with a free radical generating catalyst present in an amount of about 0.001 to 3.0% by weight. The dissolved diene rubber becomes grafted with said monomers and disperses, under shearing agitation, as second grafted diene rubber particles having a particle size of about 0.7 to 5.0 microns, said second grafted rubber particles having present about 0.5 to 5 parts of grafted and occluded polymers of said monomers. The particle size of said second grafted rubber particles can be controlled by the shear rate of the shearing agitation. Simple trials with a given reactor can determine the agitation necessary to produce a desired particle size with the higher the rate of shear the smaller the second grafted rubber particle produced within the range of about 0.5 to 10 microns.

The continuous mass polymerization of step (B) is controlled thermally by the evaporation and removal of said monomers. Said reactor is operating under isobaric conditions and the monomers are returned to said reaction zone at a rate such that steady state polymerization is maintained at a predetermined temperature.

The process is adapted to produce matrix copolymers characterized by having a weight average molecular weight ranging from about 20,000 to 1,000,000, dispersion index of from about 2.0 to 3.5, a substantially constant molecular weight distribution and a substantially constant composition distribution. The process is conducted in a reaction zone wherein the temperature ranges from about 90° to 180° C. and the associated corresponding pressure ranges from about 5 to 150 p.s.i.g.

In practicing this process, one continuously charges said monomer formulation to the reaction zone and one continuously maintains in said reaction zone a reaction system comprising a liquid monomer phase with a vapor phase generally thereabove. Such liquid phase generally fills said reaction zone to an extent of from about 40 to 90% by volume and comprises said monomer formulation as a solvent having substantially completely dissolved therein copolymer formed from said monomer formulation. Such vapor phase generally fills the balance up to 100% by volume of said reaction zone and comprises said monomer formulation, the exact composition of said vapor phase being in substantial equilibrium with the exact composition of said liquid phase. One continuously subjects said reaction system in said reaction zone to mixing action sufficient to maintain a substantially uniform composition distribution throughout said liquid phase in said reaction zone.

From said reaction zone, one continuously removes said vapor phase from said reaction zone. This vapor is removed at a rate sufficient, in combination with any heat of reaction being absorbed in said reaction zone by said charging of said monomer formulation and in combination with any heat of reaction being removed from said reaction zone through peripheral boundaries or walls thereof, to maintain in said reaction zone a substantially constant temperature and a corresponding substantially constant pressure within the respective temperature and pressure ranges above specified.

Additionally, from said reaction zone, one continuously removes said liquid phase as an effluent from said reaction zone at a rate sufficient to maintain the above specified volume of said liquid phase therein.

The said charging is conducted at a rate substantially equal to the total rate at which monomers are polymerized in said reaction zone and removed from said reaction zone. Additionally, said charging is conducted so that the ratio of total alkenyl nitrile compounds to total monoalkenyl aromatic compounds is such that both a substantially constant said monomer composition is effectively maintained in said liquid phase in said reaction zone and the copolymer formed from said monomer composition is dissolved in said liquid phase.

Various of the above steps are interrelated. Thus, the interrelationship between said charging, said liquid phase removal and said substantially constant temperature and corresponding substantially constant pressure in said reaction zone is such that:

(a) The weight percentage of said copolymer in said liquid phase in said reaction zone is maintained at a substantially constant value which is sufficient to make the viscosity of said liquid phase be below about 1,000,000 centipoises measured at said constant temperature in said reaction zone and at 10 reciprocal seconds shear rate (herein simply "sec.$^{-1}$"), and (b) The rate at which said copolymer is formed from said monomer composition in said reaction zone ranges from about 0.05 to 2.0 (preferably 0.1 to 1.0) pounds of said copolymer produced per pound of said liquid phase per hour, though larger or smaller rates are sometimes advantageous. The interrelationship in said reaction zone between said mixing action and said vapor phase removal is such that said reaction system is maintained under substantially isothermal conditions.

Further, the interrelationship between said charging, said vapor phase removal, and said reaction zone being such that:

(1) At least about 10% of the heat of reaction is removed from said reaction zone by said vapor phase removal, (2) Up to about 90% of the heat of reaction is absorbed by said charging, and (3) Up to about 50% of the heat of reaction is removed through the peripheral boundaries of said reaction zone through heat transfer. The limits on the respective quantities of heat of reaction removed by one of these three techniques are variable over wide ranges, depending upon individual circumstances, especially type and size of equipment as those skilled in the art will appreciate. Usually and typically, not more than about 200% of the heat of reaction is removed through vapor phase removal (for example, by reflux condensation), not less than about 5% is removed through charging absorption and not more than about 25% is removed through heat transfer through reaction zone peripheral boundaries. In one preferred mode of operating at steady state conditions, the heat of reaction removed through vapor phase removal ranges from about 25 to 45%, the heat of reaction removed through absorption by charging ranges from about 55 to 75% and the heat of reaction removed through reaction zone peripheral boundaries (e.g., a reactor wall) ranges from about −10 to +10%. Percentages over 100% indicate heat being removed at a greater rate than being generated; percentages under 0 (negative values) indicate heat input, as by heat transfer.

By the practice of the present invention, heat of reaction removal is so efficient through vapor phase removal that it is sometimes convenient and desirable to operate by having peripheral boundaries of the reaction zone at a somewhat higher temperature than the interior thereof, since such a heat input drives vapor phase removal in the direction of superior temperature control of the reaction zone interior. In one more preferred mode of operating, about ⅓ of the heat of reaction is removed through vapor phase removal and the remaining ⅔ approximately is removed through charging absorption with substantially none being removed through the peripheral boundaries of the reaction zone.

In preferred modes of practicing this invention, the vapor phase removed as above indicated is condensed and returned to the reaction zone (as by a reflux condensation) so as to constitute thereby a portion of the monomer composition charged to this zone. Preferably, the charging is accomplished by spraying, as in an atomized form, the monomer composition into the reaction zone.

Preferably, the process is practiced so that, as under virtual steady state conditions, the weight percentage of copolymer in the liquid phase in the reaction zone is at least about 30. More preferably, this weight percentage of copolymer ranges from about 30 to 80 with conversion rates of at least about 0.5 lbs. copolymer/lb. liquid phase/hr. Preferably, the process is so practiced that the viscosity of such liquid phase ranges from about 50,000 to 150,000 centipoises at the constant temperature of the reaction zone and at 10 sec.$^{-1}$.

The rubbers can be analyzed for graft and occlusions along with swelling index by the well known gel tests. The first or second grafted rubber copolymers is dispersed in tetrahydrofuran (1 g/10 ml) which dissolves the polymer leaving the dispersed rubber as a gel phase. The rubber phase is separated from the dispersion by centrifuge as a gel and dried in a vacuum oven at 50° C. for 12 hours and weighed as a dry gel.

$$\frac{\% \text{ Dry gel}}{\text{in Polyblend}} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber}} \times 100$$

$$\left.\begin{array}{l}\text{Parts by weight} \\ \text{of graft polymer} \\ \text{and occluded polymer per unit weight} \\ \text{of rubber}\end{array}\right\} = \frac{\% \text{ dry gel} - \% \text{ rubber}}{\text{Percent rubber}}$$

*Percent rubber determined by infra-red spectrochemical analysis of the dry gel

The swelling index of the grafted rubber can range from 2 to 40, preferably 7 to 20.

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

The following examples are set forth to illustrate more clearly the principles and practice of this invention to one skilled in the art. They are not intended to be restrictive but merely illustrative of the invention herein described.

EXAMPLE 1

A monomer formulation having a weight ratio of styrene to acrylonitrile of 70:30 containing 4% by weight of a polybutadiene rubber dissolved therein and 16% by weight of a first grafted polybutadiene rubber dispersed therein, said rubbering being grafted with about 60 parts of styrene/acrylonitrile (70/30) was prepared and charged to a reaction zone, as disclosed in U.S. Pat. No. 3,813,369, at a rate of about 224 lbs/hr. The first preformed grafted diene rubber had a particle size of about 0.20 microns. The reaction zone is maintained at about a 65% volumetric fillage level based on a substantially non-expanded liquid phase with a vapor thereabove composed of unreacted monomers. Paddle assembly is rotated therein at about 12 r.p.m. which produces mixing action which maintains in the liquid phase a substantially uniform composition distribution.

After start up is completed and substantially steady state continuous mass polymerization conditions are reached at 50% conversion, the temperature in the reaction zone is maintained at about 173° C. with the pressure therein being about 35 p.s.i.a. The jacket about the reaction zone is fluid filled and the fluid therein is maintained by heat exchange circulation at about 118° C.

A vaporized monomer composition at steady state conditions is continuously withdrawn at a total rate of about 20 pounds per hour from the vapor phase of the reaction zone at a rate sufficient to maintain the temperature in the reaction zone under substantially isothermal conditions at about 173° C. (as indicated above). The so withdrawn monomer composition is collected and condensed and returned to the reaction zone. Analysis of the condensate shows it to comprise about 30 weight percent styrene and about 7 weight percent acrylonitrile. The composition of the vapor phase is found to be in substantial equilibrium with the composition of the liquid phase.

The liquid phase is continuously removed at steady state conditions from the bottom, central region of the reaction zone with the aid of a pump at a rate of about 224 pounds per hour which is sufficient to maintain the above-specified volume of fluid in the reaction zone. As this liquid phase is found by analysis to contain substantially completely dissolved therein about 50 weight percent based on total liquid phase of a styrene/acrylonitrile copolymer with the balance up to 100 weight percent thereof comprising a mixture of unreacted styrene and unreacted acrylonitrile monomers and dispersed first and second grafted rubbers. The copolymer comprises about 75 weight percent styrene and about 25 weight percent acrylonitrile and has a weight average molecular weight of about 360,000, a dispersion index of about 2.9. This copolymer has a substantially constant molecular weight distribution and a substantially constant composition distribution. This copolymer is substantially without haze. The unreacted monomer composition comprises about 75 weight percent styrene and about 25 weight percent acrylonitrile. The rate of liquid phase removal from the reaction zone is about 224 pounds per hour. The viscosity of the liquid phase is estimated to be about 65,000 centipoises at 173° C. and at 10 sec.$^{-1}$. The rate at which this copolymer is formed from the monomer composition is about 0.46 pounds of copolymer per pound of liquid phase per hour.

At these steady state conditions, about 11.8% of the heat of reaction is removed from the reaction zone by the removal of the vapor from the vapor phase, about 61.4% of the heat of reaction is absorbed by the monomer being charged and about 26.8% of the heat of reaction is removed by heat exchange through the wall of the reaction zone.

The liquid phase or effluent removed from the reaction zone is subjected to devolatilization through two states of wiped film devolatilization at 240° C. and a pressure of 6 mm Hg. separating the residual monomer from the effluent producing an ABS polyblend having first and second grafted particles present as a bimodal rubber particle size distribution. The devolatilization was carried out by the wiped film devolatilization process disclosed in U.S. Pat. No. 3,812,897 to G. A. Latinen. Temperatures of 180° to 250° C. and pressures of about 1 to 500 mm of Hg can be used. Alternatively, the devolatilization can be carried out by one or two stage falling strand devolatilization as disclosed in U.S. Pat. No. 3,928,300. Analysis of the ABS polyblend showed the polyblend to be about 22.8% by weight first grafted diene rubber and 5.7% by weight second grafted diene rubber with about 71.5% by weight SAN copolymer.

The dispersed rubber phase increases the toughness of the ABS type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength in the range of 0.7 to 10 microns measured as a weight average particle size diameter with a photosedimentomer by the published procedure of Graves, M. J. et.al., "Size Analysis of Subsieve Powders Using a Centrifugal Photosedimentometer," British Chemical Engineering 9:742-744 (1964). A Model 3000 Particle Size Analyzer from Martin Sweets Co., 3131 West Market Street, Louisville, Ky., was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.7 to 10 microns can be used for the large particles with the range of 0.7 to 5 microns being preferred and 0.8 to 3 microns being most preferred for optimum impact and strength and gloss.

The small particles in the polyblend can range from 0.01 to 0.50 microns in diameter on a weight average basis as determined by the photosedimentometer test described for the large rubber particles. Preferably, the range is 0.05 to 0.40 and most preferably from 0.1 to 0.3 microns in diameter on a weight average basis.

The first grafted diene rubber particles had a particle size of about 0.20 microns and a graft level of about 0.60 parts of SAN polymer per part of rubber. The second grafted rubber particles had a particle size of about 2.3 microns having present about 1.7 parts of grafted and occluded SAN copolymer per part of rubber. The soluble diene rubber dispersed as large second grafted diene rubber particles having occluded SAN copolymer internally dispersed and a grafted SAN copolymer phase as evidenced by electron microscope microphotographs. It is evident from the microphotographs, that the soluble rubber being incompatible in the partially polymerized reaction mixture, contained in the reactor, disperses as rubber-monomer globules that polymerize into the second grafted rubber particles. The shearing agitation was sufficient to size these particles to about 2.3 microns and disperse them with the preformed first grafted diene rubber particles in the matrix phase SAN polymer being formed during the continuous mass polymerization providing an ABS polyblend having a bimodal rubber particle size distribution.

EXAMPLES 2-5

Example 1 was essentially repeated using different operating conditions and rubber concentrations as described in Table 1 infra:

TABLE 1

| Example No. | Wgt. % Soluble Rubber | Wgt. % 1st Diene Rubber | Mass Poly Conv. % | Mass Poly Temp. °C. | Reactor Stirring Rate rpm. | Mol Wgt. Matrix ($10^{-3}$) | 2nd Rubber Particle Size (μ) |
|---|---|---|---|---|---|---|---|
| 1 | 4 | 16 | 50 | 173 | 12 | 360 | 2.1 |
| 2 | 2 | 8 | 65 | 195 | 12 | 235 | 2.6 |
| 3 | 2 | 8 | 59 | 184 | 12 | 289 | 2.3 |
| 4 | 2 | 8 | 60 | 184 | 6 | 285 | 4.9 |
| 5 | 2 | 8 | 60 | 184 | 24 | 279 | 1.2 |

It is evident from the data that higher polymerization temperatures reduce the molecular weight of the matrix SAN copolymer and higher rates of agitation reduce the particle size of the second grafted diene rubber whereas lower rates of agitation increase the rubber particle size. In all cases the first grafted diene rubber particle remained about the same size or charged in the monomer formulation, i.e., about 0.2 microns with some additional grafting occurring during the continuous mass polymerization step.

EXAMPLE 6

An aqueous latex containing about 30% by weight of grafted butadiene rubber particles, grafted with about 60 parts of styrene and acrylonitrile (70/30) was prepared by the process of U.S. Pat. No. 3,509,237. About 100 parts of the latex was mixed with 30 parts of acrylonitrile and 70 parts of styrene followed by about 6 parts of a cationic surfactant solution (5% sulfuric acid water solution containing 15% by weight of a polyol amine sulfate salt—TETRONIC 50R1 from BASF Wyandotte Corp., Parsippany, N.J.)

The mixture separated into a monomer phase having the grafted rubber particles dispersed therein and an aqueous phase. The mixture was centrifuged removing the water phase. About 57 parts of 70/30 styrene/acylonitrile monomers was added to the monomer phase providing a monomer formulation having about 16% by weight grafted diene rubber particles. About 8 parts of soluble butadiene rubber was dissolved in the monomer formulation providing a monomer formulation having about 4.0% by weight of dissolved butadiene rubber. This procedure is preferred for preparing the monomer formulations containing dissolved and dispersed rubbers for charging to the present process. Alternatively, the soluble diene rubber can be dissolved in a separate monomer formulation and mixed with the monomer formulation having the first grafted diene rubber particles dispersed therein.

What is claimed is:

1. A continuous mass polymerization process for preparing an ABS polyblend having a bimodal rubber particle size distribution, the steps comprising:
   (A) continuously charging a monomer formulation of alkenyl aromatic and alkenyl nitrile monomers having a soluble diene rubber dissolved therein and first grafted diene rubber particles dispersed therein to a reaction zone, said grafted rubber having alkenyl aromatic and alkenyl nitrile grafts, said first grafted diene rubber particles having an average particle size of about 0.01 to 0.5 microns,
   (B) continuously mass polymerizing said charged monomer formulation in said reaction zone, to a conversion of about 30 to 80%, while forming and dispersing said soluble diene rubber as second grafted diene rubber particles having present occluded and grafted polymers of said monomers in amount of about 0.5 to 5.0 parts per part of rubber, said second grafted diene rubber particles having an average particle size of about 0.7 to 10.0 microns, said monomers forming a copolymer of said monomers as a matrix phase polymer having said first and second rubber particles dispersed therein,
   (C) continuously removing an effluent from said reaction zone at a rate essentially equal to that of said charged monomer formulation, and
   (D) separating said matrix polymer having said first and second grafted rubber particles dispersed therein from said effluent as said ABS polyblend having a bimodal rubber particle size distribution, wherein the weight ratio of alkenyl aromatic to alkenyl nitrile monomers in said monomer formulation is about 85:15 to 60:40; wherein said soluble diene rubber moiety and said first grafted diene rubber moiety are present in said monomer formulation in a total amount of about 2 to 40 percent by weight with said soluble rubber moiety being about 5 to 50 percent by weight of the total rubber moiety; wherein the polymerization of step (B) is conducted at temperatures of about 90° to 180° C. under a pressure of about 5 to 150 psia with shearing agitation; wherein said diene rubbers are polybutadiene based rubbers.

2. A process of claim 1 wherein said monoalkenylaromatic monomer is styrene, said ethylenically unsaturated monomer is acrylonitrile and said diene rubber polybutadiene.

3. A process of claim 1 wherein said monoalkenylaromatic monomer is styrene.

4. A process of claim 1 wherein said ethylenically unsaturated nitrile monomer is acrylonitrile.

5. A process of claim 1 wherein the said monoalkenylaromatic monomer and said ethylenically unsaturated nitrile monomer comprise at least 75% by weight of said monomer formulation.

6. A process of claim 1 wherein said soluble diene rubber of said second grafted rubber is polybutadiene having a cis isomer content of about 30 to 98% and a Tg range of from about −50° C. to −105° C.

7. A process of claim 1 wherein said first and second grafted rubbers have a swelling index of about 5 to 30 as contained in said ABS polyblend.

8. A process of claim 1 wherein the matrix copolymer formed has an average molecular weight of from about 20,000 to 1,000,000.

9. A process of claim 1 wherein the polymerization step (B) is carried out with said monomer formulation having present about 0.001 to 3.0% by weight of a free radical generating catalyst.

10. A process of claim 9 wherein said free radical generating catalyst is selected from the group consisting of di-tert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

11. A process of claim 10 wherein said free radical generating catalyst is tert-butyl peracetate.

12. A process of claim 10 wherein said free radical generating catalyst is di-tert-butyl peroxide.

13. A process of claim 1 wherein the continuous mass polymerization of step (B) is conducted at temperatures of 90° to 180° C.

14. A process of claim 1 wherein the polymerization step (B) is controlled thermally by evaporating and removal of said monomers under isobaric conditions and shearing agitation from said reaction zone.

15. A process of claim 14 wherein the evaporated and removed monomers are liquified and returned to the reaction zone at a rate such that steady state polymerization is maintained.

16. A process of claim 1 wherein said separation of step (D) is carried out by devolatilization of said effluent at temperatures of about 150° to 250° C., under subatmospheric pressure.

17. A process of claim 1 wherein said first and second grafted diene rubber particles are present in said ABS polyblend in amount such that a total diene rubber moiety of about 2 to 40% by weight is present, said second grafted rubber being about 5 to 50% of said total rubber moiety.

18. A process of claim 1 wherein said reaction zone is a back-mixed, flow-through, reaction zone operating at a partial fillage of about 40 to 90% with monomer evaporational cooling.

19. A continuous mass polymerization process for preparing an ABS polyblend having a bimodal rubber particle size distribution, the steps comprising:

(A) continuously charging a monomer formulation of styrene and acrylonitrile monomers having a soluble polybutadiene rubber dissolved therein and first grafted polybutadiene rubber particles dispersed therein to a reaction zone, said first grafted polybutadiene rubber particles having an average particle size of about 0.01 to 0.5 microns, (B) continuously mass polymerizing said charged monomer formulation in said reaction zone, to a conversion of about 30 to 80 percent, while forming and dispersing said soluble polybutadiene rubber as second grafted polybutadiene rubber particles having present occluded and grafted polymers of said monomers in amount of about 0.5 to 5.0 parts per part of rubber, said second grafted polybutadiene rubber particles having an average particle size of about 0.7 to 10.0 microns, said monomers forming a copolymer of said monomers as a matrix phase polymer having said first and second rubber particled dispersed therein, (C) continuously removing an effluent from said reaction zone at a rate essentially equal to that of said charged monomer formulation, and (D) separating said matrix polymer having said first and second grafted rubber particles dispersed therein from said effluent as said ABS polyblend having a bimodal rubber particle size distribution, wherein the polymerization of step (B) is conducted at temperatures of about 90° to 180° C. under pressure of about 5 to 150 psia with shearing agitation; wherein said soluble diene rubber moiety and said first grafted diene rubber moiety are present in said monomer formulation in a total amount of about 2 to 40 percent by weight with said soluble rubber moiety being about 5 to 50 percent by weight of the total rubber moiety; wherein the weight ratio of styrene to acrylonitrile monomers in said monomer formulation is about 85:15 to 60:40.

* * * * *